United States Patent [19]

Bradic

[11] Patent Number: 5,786,309
[45] Date of Patent: Jul. 28, 1998

[54] PROCESSES FOR MAKING POLYFLUORFULLERENE AND COMPOSITIONS COMPRISING SAME

[76] Inventor: Marijan Bradic, M. Kiepacha 41, HR-43260 Krizevci, Croatia

[21] Appl. No.: 650,827

[22] Filed: May 20, 1996

[30] Foreign Application Priority Data

May 19, 1995 [DE] Germany ............... 195 18 005.4

[51] Int. Cl.$^6$ ............... C10M 131/02; C07C 17/013; C07C 17/02
[52] U.S. Cl. ............... 508/588; 204/157.15; 204/157.42; 204/157.44
[58] Field of Search ............... 508/588; 204/157.15, 204/157.42, 157.44

[56] References Cited

U.S. PATENT DOCUMENTS

| | | | |
|---|---|---|---|
| 5,248,498 | 9/1993 | Neumann et al. | 424/9 |
| 5,354,926 | 10/1994 | Fagan et al. | 570/129 |
| 5,558,903 | 9/1996 | Bhushan et al. | 427/11 |
| 5,589,038 | 12/1996 | Ata et al. | 204/157.42 |

FOREIGN PATENT DOCUMENTS 06-024720-A 7/1992 Japan.
06-024721-A 7/1992 Japan.

OTHER PUBLICATIONS

A. Hirsh, Angew. Chem., 1993, pp. 2–36 and 163–184.
Holloway, et al., "Fluorination of Buckminsterfullerene", *Chem. Soc. Chem. Commun.* (1991).
Hamwi, et al., Preparation and Characterization of Fluorinated Fullerenes, *Fullerene Science & Technology*, 1(4) (1993).

*Primary Examiner*—Jerry D. Johnson
*Attorney, Agent, or Firm*—Wigman, Cohen, Leitner & Myers, P.C.

[57] ABSTRACT

The invention relates to a process for making polyfluorofullerene as well as polyfluorofullerene itself made according to the process.

In the process according to the invention, a fullerene solution is mixed with a polytetrafluoroethylene dispersion, and the reaction mixture is irradiated with fluorescent light to form polyfluorofullerene.

The polyfluorofullerene thus made can be used as oiling agent, lubricant, or as additive for lubricants.

11 Claims, No Drawings

1

PROCESSES FOR MAKING POLYFLUORFULLERENE AND COMPOSITIONS COMPRISING SAME

BACKGROUND OF THE INVENTION

This invention relates to a process for making polyfluorofullerene and to compositions comprising polyfluorofullerene.

This application is based on German Patent Application File No. 195 18 005.4, hose disclosure is incorporated herein in its entirety.

Polyfluorofullerenes are derived from the fullerenes.

This new substance class consisting of $C_{60}$, $C_{70}$ fullerenes was documented as existing for the first time in 1985 by means of mass spectroscopy investigations (H. W. Kroto, J. R. Heath, S. C. O'Brien, R. F. Curl, R. E. Smalley, Nature 1985, 318, 162), and the first macroscopic quantities were made in 1990 (W. Krätschmer, L. D. Lamb, K. Fostiropoulos, D. R. Huffman, Nature 1990, 347, 354).

Until the present invention, polyfluorofullerenes were obtained from solid fUllerene by treating a solution of fullerene in dichloromethane with $XeF_2$ or due to the action of $F_2$ gas at low pressure (D. A. Dixon, N. Matsuzawa, T. Fukunaga, F. N. Tebbe, J. Phys. Chem. 1992, 96, 6107, J. H. Holloway, E. G. Hope, R. Taylor, G. L. Langley, A. G. Advent, T. J. Dennis, J. H. Hare, H. W. Kroto, D. M. Walton, J. Chem. Soc. Chem. Commun. 1991, 966; H. Selig, C. Lifshitz, T. Peres, J. E. Fischer, A. R. McGhie, W. J. Romanov, J. P. McCauley Jr., A. B. Smith III, J. Am. Chem. Soc. 1991, 113, 5476)

In the process, polyfluorofullerenes were obtained with a varying degree of fluorination having the empirical formula $C_mF_{2n}$, where m, n are natural numbers with m=60 or 70 and n=15–35, but can vary both below and above the given range. For example, a hyperfluorinated fullerene with n=51 and the general empirical formula $C_{60}F_{102}$ has already been documented by way of mass spectroscopy. Fullerenes with m>70 and the corresponding fluorinated compounds are also possible.

Fullerene Sci. Technol. (1993), 1 (4), 499–535 discloses comprehensive investigation results pertaining to the manufacture of polyfluorofullerene due to the action of $F_2$ gas upon solid fullerene with reaction times, temperature and the $F_2$ being varied. Both pure $C_{60}$ fullerene and a mixture of $C_{60}/C_{70}$ fullerene were used as initial compounds.

With relation to the use of the new substance class of polyfluorofullerenes, Derwent Abstr. No. 94-071 652/09 discloses that in JP 060 24720-A, polyfluorofullerene is made by means of the action of $F_2$ gas on fullerene in the presence of hydrogen fluoride and the resulting polyfluorofullerene is suitable as a lubricant or as additive for lubricants.

OBJECTS AND SUMMARY OF THE INVENTION

A principal object of the present invention is to provide an improved method for making polyfluorofullerenes.

Another object of the present invention is to provide compositions comprising polyfluorofullerenes for lubricants or as lubricant additives.

Other objects and advantages will become apparent from the disclosures which follow.

In the process according to the present invention, fullerene is dissolved in an apolar solvent and mixed with a polytetrafluoroethylene dispersion. The reaction mixture is irradiated with fluorescent light having a wavelength in the range of about 380–780 nm during the mixing period. Fluorescent light is used as activation energy, because fullerene is photosensitive and in the visible range spectrum absorbs from about 200 to 600 nm.

Benzene or toluene are preferred as apolar solvents, however, other solvents, e.g., hexane, can also be used as well as mixtures of two or more solvents. Although the mixing time of the fullerene solution with the polytetrafluoroethylene dispersion should be at least about 10 minutes, increasing the mixing time does not have a disadvantageous effect on the result of the reaction.

The temperature is generally kept at about 30° to 40° C., or more (e.g., greater than 100° C.) during mixing. Care must be taken to make sure that the temperature remains below the decomposition temperature of the polytetrafluoroethylene.

The resulting polyfluorofullerene can be recovered by sublimation at about 350° C. under a protective gas atmosphere. Or, it can be extracted using an apolar solvent, preferably benzene or toluene. The latter is possible because the constituents of the reaction mixture—that are not converted into polyfluorofullerene—are not soluble in the solvent mentioned. Here again, other conventional solvents such as, for example, hexane, can be used as well as two or more suitable solvents.

If desired, extraction can be followed by sublimation in order to provided highly pure, polyfluorofullerene.

The polyfluorofullerene made according to the invention can have many uses.

For example, it can be used as oiling agent in the chemical industry or as lubricant or as additive to lubricants.

The invention will now be described in greater detail by way of the following examples.

DESCRIPTION OF THE EMBODIMENTS (BEST MODE)

Example I: Method of Making Polyfluorofullerene 40 mg fullerene was dissolved in 5 ml of benzene and 2 g dispersed polytetrafluoroethylene was added. The fullerene used for this purpose was produced at the "Ruder Boskovic" Institute in Zagreb where it was procured from Hoechst. The degree of purity of the fullerene procured from Hoechst was 99.9%, according to manufacturer's information. The fullerene which is used can consist of $C_{60}$, $C_{>60}$, $C_{70}$ and $C_{>70}$ as well as mixtures of these fullerenes. The temperature was set at between 30° and 40° C., and the components were mixed by means of ultrasound with stirring, over a period of 10 minutes. In addition, activation energy in the form of fluorescent light was applied while stirring. The emitted radition is in the visible or near the visible range of the spectrum, roughly in the range from 380 to 780 nm. The reaction vessel used for this fluorination reaction is made of polytetrafluoroethylene.

During the mixing process, a reaction mixture is obtained having a bright to dark yellow color from the white dispersion of the polytetrafluoroethylene and the violet solution of fullerene.

Example I(A): Varying the Mixing Times

The method of Example I was followed except that the mixing time was varied and increased incrementally up to a mixing time of three days.

3

Compared to the mixing time of 10 minutes of Example I, increasing the mixing time did not change the reaction results. The yield remained essentially constant.

Example I(B): Varying the Fullerene Concentration

The procedure of Example I was followed except that the fullerene concentration as varied. It was determined that up to 2 g of fullerene could be dissolved in 5 ml of enzene. The quantity of dispersed polytetrafluoroethylene was kept constant. The best mixture was achieved when 60 mg of fullerene was used with the same solvent volume of 5 ml and 2 g of dispersed polytetrafluoroethylene.

Example I(C): Varying the Temperature

At first, the procedure of Example I was used. To achieve greater saturation, the reaction mixture was then heated to about 100° C. over a period of up to five days. By achieving greater saturation, it was desired to obtain a higher yield and, then, a higher degree of fluorination in the direction n =30 of the general empirical formula, which would correspond to perfluorinated fullerene. However, when compared to the reaction of Example I, no ascertainable change in the reaction result was observed. In particular, the yield remained essentially constant. Nevertheless, an increased temperature is advantageous for isolating and recovering polyfluorofullerene by means of sublimation—as will be described hereinafter—because, when benzene is used as the solvent, evaporation occurs at the temperature mentioned, and sublimation can readily occur.

Example I(D): Varying the Solvents

The procedure of Examples I(A)–I(C) were followed except that instead of enzene, toluene was used. No ascertainable changes in the reaction behavior were observed compared to benzene.

Generally, any apolar solvent is suitable. The more polar a solution is, however, the less suitable is it for use as a solvent in the context of the present invention. Accordingly, solvents such as THF and acetone can still be used whereas, for example, water is unsuitable as a solvent.

Comparative Example I(E)

The procedure of Example I was employed except that instead of using the fullerene solution, a powdery fullerene was used. The temperature was also raised to about 400° C. No conversion to polyfluorofullerene was observed.

Example II: Isolating Polyfluorfullerene by Sublimation

After the mixture was made and the reaction occurs in the manner described in Example I, the temperature was raised to permit the solvent to evaporate. The temperature was kept below the decomposition temperature of polytetrafluoroethylene, i.e., at a temperature somewhat over 100° C. The temperature was then raised to about 350° C., and the polyfluorofullerene was sublimated under a protective gas atmosphere.

Alternatively, sublimation can also be carried out in a vacuum. Both sublimation under a protective gas atmosphere and in a vacuum are suitable for essentially preventing the development of byproducts such as oxy-compounds of polyfluorofullerene by at least partial reaction with oxygen.

Example III: Isolating Polyfluorofullerene by Extraction

The procedure of Example I was employed to form polyfluorofullerene. Polyfluorofullerene was then recovered from the reaction mixture by means of extraction sing benzene or toluene as the extraction agent. The unreacted polytetrafluoroethylene contained in the reaction mixture is insoluble in benzene, whereas polyfluorofullerene is dissolved in benzene. Other apolar solvents, such as, for example, hexane or mixtures of at least two suitable apolar solvents, can be used.

Example IV

The recovered polyfluorofullerene was analyzed by means of mass spectrometry. It was found that polyfluorofullerene having the general empirical formula $C_m F_{2n}$ was formed where m=60, 70 and n=20–35.

Although certain presently preferred embodiments of the present invention have been specifically described herein, it would be apparent to those skilled in the art to which the invention pertains that variations and modifications of the various embodiments shown and described herein maybe made without departing from the spirit and scope of the invention. Accordingly, it is intended that the invention be limited only to the extent required by the appended claims and the applicable rules of law.

What is claimed is:

1. A process for making polyfluorofullerene comprising the steps:

providing a fullerene solution in an apolar solvent;

mixing said solution with a polytetrafluoroethylene dispersion;

irradiating said mixture with light; and recovering polyfluorofullerene.

2. Process according to claim 1, wherein said apolar solvent is benzene or toluene.

3. Process according to claim 1, wherein the mixing time is at least about 10 minutes.

4. The process according claim 1, wherein the mixing temperature is kept at about 30° to 40° C.

5. The process according to claim 4, wherein after mixing the temperature is raised to a temperature sufficient to remove said solvent but is below the decomposition temperature of polytetrafluoroethylene.

6. The process of claim 4 wherein the polyfluorofullerene is recovered under vacuum.

7. Process according to claim 1, wherein said polyfluorofullerene is recovered by sublimation at an elevated temperature under a protective gas atmosphere.

8. Process according to claim 1, wherein said polyfluorofullerene is recovered by extraction using an apolar solvent.

9. The process of claim 1 wherein the irradiation is provided by a fluorescent light source.

10. The process of claim 1 wherein the mixture is stirred with ultrasound and the irradiation wavelength is about 380 to 780 nm.

11. The process of claim 1 wherein the polyfluorofullerene recovered has the general empirical formula $C_m F_{2n}$ wherein m=60, 70 and n=20–35.

* * * * *